(12) United States Patent
Dorsey et al.

(10) Patent No.: US 7,333,795 B2
(45) Date of Patent: Feb. 19, 2008

(54) EMERGENCY CALL PLACEMENT METHOD

(75) Inventors: Donald A. Dorsey, Vernon Hills, IL (US); Srikrishna M R, Bangalore (IN); Sharada Raghuram, Buffalo Grove, IL (US)

(73) Assignee: Motorola Inc., Schaumburg, IL (US)

( * ) Notice: Subject to any disclaimer, the term of this patent is extended or adjusted under 35 U.S.C. 154(b) by 425 days.

(21) Appl. No.: 10/693,247

(22) Filed: Oct. 24, 2003

(65) Prior Publication Data

US 2005/0090224 A1    Apr. 28, 2005

(51) Int. Cl.
*H04M 11/04* (2006.01)
(52) U.S. Cl. .................. 455/404.1; 455/435.1
(58) Field of Classification Search .. 455/404.1–404.2, 455/450, 422.1, 435.1, 436, 442–448, 453, 455/456.1–457, 435.2, 435.3, 521
See application file for complete search history.

(56) References Cited

U.S. PATENT DOCUMENTS

| | | | |
|---|---|---|---|
| 6,792,284 B1* | 9/2004 | Dalsgaard et al. | 455/525 |
| 7,127,250 B2* | 10/2006 | Gallagher et al. | 455/436 |
| 2003/0003928 A1* | 1/2003 | Marjelund et al. | 455/464 |
| 2003/0157923 A1* | 8/2003 | Tani | 455/404 |
| 2004/0087305 A1* | 5/2004 | Jiang et al. | 455/432.1 |
| 2004/0147266 A1* | 7/2004 | Hwang et al. | 455/445 |
| 2004/0224688 A1* | 11/2004 | Fischer | 455/435.1 |
| 2005/0101288 A1* | 5/2005 | Hulkkonen et al. | 455/404.1 |

OTHER PUBLICATIONS

3 GPP TS 24.008 v3.16.0 (Jun. 2003), 3rd Generation Partnership Project; Technical Specification Group Core Network; Mobile Radio Interface Layer 3 Specification; Core Network Protocols; Stage 3 (Release 1999).*
GSM: Global System for Mobile Communications 3GPP TS 24.008 v3.16.0 (Jun. 2003) Technical Specification 3rd Generation Partnership Project; Technical Specification Group Core Network: Mobile Radio Interface Layer 3 Specification; Core Network Protocols; Stage 3 (Release 1999).
3GPP; "3rd Generation Partnership Project; Technical Specification Group Services and Systems Aspects; Network Architecture (Release 5)"; 3GPP TS 23.002 V5.12.0 (Sep. 2003); pp. 1-14.
ETSI; "Digital Cellular Telecommunications System (Phase 2+); Handover Procedures (GSM 03.09 Version 7.0.0 Release 1998)"; ETSI TS 100 527 V7.0.0 (Aug. 1999); pp. 1-23.

* cited by examiner

*Primary Examiner*—Duc M. Nguyen
*Assistant Examiner*—Anthony S. Addy
(74) *Attorney, Agent, or Firm*—Sylvia Chen

(57) ABSTRACT

An emergency call placement method (300) used in user equipment in idle mode camped on a first cell of a wireless communication network having a first radio access technology includes the steps of requesting (316) a radio resource control connection using "emergency call" as an establishment request, changing (340, 350) to a new cell in a different location area or routing area than the first cell, and requesting again (316) a radio resource control connection using "emergency call" as an establishment request. This method avoids performing a location area update or a routing area update when the user equipment changes to a new cell during an emergency call and thus may speed up placement of the emergency call by several seconds.

14 Claims, 3 Drawing Sheets

EMERGENCY CALL PLACEMENT METHOD

FIELD OF THE DISCLOSURE

This disclosure relates generally to telecommunications, and more particularly to placing an emergency call on user equipment within a cellular telecommunications system.

BACKGROUND OF THE DISCLOSURE

The radio transmissions of a single base station cover a particular geographical area usually called a "cell." A change in serving cell occurs as a mobile station (MS or user equipment (UE)) travels from an old cell to a new cell. This permits mobile stations to "roam" considerable distances. In view of the extent to which a UE can travel, a number of geographic area levels are utilized for mobility management. A location area (LA) is a group of cells established by a service operator for circuit-switched connections. A routing area (RA) is a group of cells established by a service operator for packet-switched connections. As the UE moves, it updates its LA and/or RA so the UE can be located within that larger area even when it travels outside of a particular cell. Then, when the network needs to establish a connection or exchange data with a UE and the location of the UE is not known at a cell level, the UE is paged within the last location area or routing area updated by the UE. The UE answers the page by sending a page response message to the network from the particular cell where the UE is currently located.

A UE can change its serving cell (which consequently may be in a different LA or RA) autonomously, using a procedure called reselection. When the UE is in idle mode and is camped normally on a cell, it monitors its neighboring cells for a possible reselection in case one of the neighboring cells provides better service. Alternately, a UE can change its serving cell as directed by the network, using a procedure called redirection. If a reselection or redirection is to a cell in a different LA or RA, a location area update (LAU) or routing area update (RAU) will be needed.

The process of LAU and RAU may take several seconds due to the various authentication and identification procedures that the network may request. If a UE begins to place an emergency call and it then changes tQ a cell in a different LA and/or RA through redirection or reselection, then it will perform a LAU and/or RAU, which may delay placement of the emergency call. Thus, it is desirable to avoid performing location area updates and routing area updates when attempting to place an emergency call.

The various aspects, features and advantages of the disclosure will become more fully apparent to those having ordinary skill in the art upon careful consideration of the following Drawings and accompanying Detailed Description.

DETAILED DESCRIPTION OF THE PREFERRED EMBODIMENT

An emergency call placement method for use in user equipment in idle mode camped on a first cell of a wireless communication network having a first radio access technology includes the steps of requesting a radio resource control connection using "emergency call" as an establishment request, changing to a new cell in a different location area or routing area than the first cell, and requesting again a radio resource control connection using "emergency call" as an establishment request. This method avoids performing a location area update or a routing area updating when the user equipment changes to a new cell during an emergency call and thus may speed up placement of the emergency call by several seconds.

Figure 1:
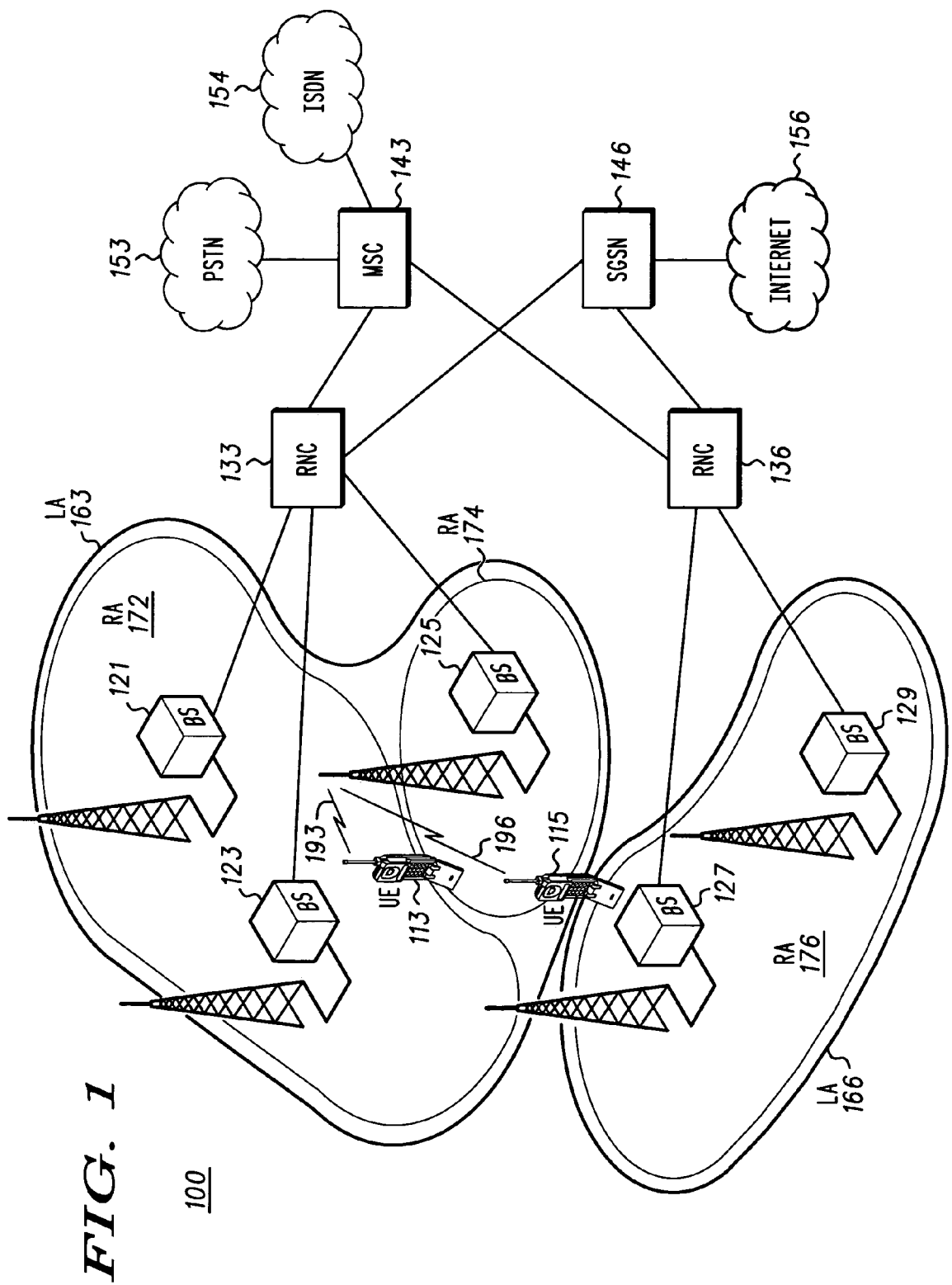
FIG. 1 shows a simplified diagram of a mobile communication system according to a preferred embodiment.

FIG. 1 shows a simplified diagram of a mobile communication system 100 according to a preferred embodiment. In the system 100, user equipment (UE), sometimes referred to as a mobile station (MS), communicates over-the-air with at least one base station (BS), sometimes called a base transceiver station (BTS). UE 113 is in idle mode and camped on BS 125 as indicated by signal 193. UE 115 is also in idle mode and also camped on BS 125 as indicated by signal 196. There are other base stations, BS 121, BS 123, BS 127, and BS 129, in varying degrees of proximity to UE 113 and UE 115. A radio network controller (RNC), sometimes called a base station controller (BSC), manages one or more base stations. In this simplified diagram, RNC 133 manages BS 121, BS 123, and BS 125 while RNC 136 manages BS 127 and BS 129. The radio network controllers and their associated base stations make up a radio access network (RAN).

The RAN is connected to at least one telecommunications core network through control nodes. There are different control nodes depending on whether the communication connection is circuit-switched or packet-switched. A mobile switching center (MSC) 143 connects to circuit-switched networks such as a public switched telephone network (PSTN) 153 and an integrated services digital network (ISDN) 154. A Serving GPRS Support Node (SGSN) 146 connects to packet-switched networks such as the Internet 156.

At a conceptual level, the coverage areas of BS 121 and BS 123 have been grouped together to form a routing area (RA) 172 for packet-switched connections. The coverage area of BS 125 is another routing area 174. And the coverage areas of BS 127 and BS 129 are a third routing area 176. A service operator determines routing areas and, in general, a single routing area has multiple cells; however, we have simplified this diagram with the result that the routing areas are unusually small.

Similarly, the coverage areas of BS 121, BS123, and BS 125 make up a single location area (LA) 163 for circuit-switched connections. The coverage areas of BS 127 and BS 129 are a second location area 166. In general, a service operator groups multiple cells into a single location area; however, we have simplified this diagram with the result that the location areas are unusually small. Typically, a location area is larger than a routing area. In this specification, the terms "routing area" or "location area" are generically referred to as "steering area."

Note that UE 113 straddles two routing areas RA 172 and RA 174, but it is well within a single location area LA 163. If the serving cell of the UE 113 changes, it may need to update its routing area but not its location area. UE 115 straddles two routing areas RA 174 and RA 176 and two location areas LA 163 and LA 166. If the serving cell of the UE 115 changes, it may need to update both its routing area and its location area.

Figure 2:
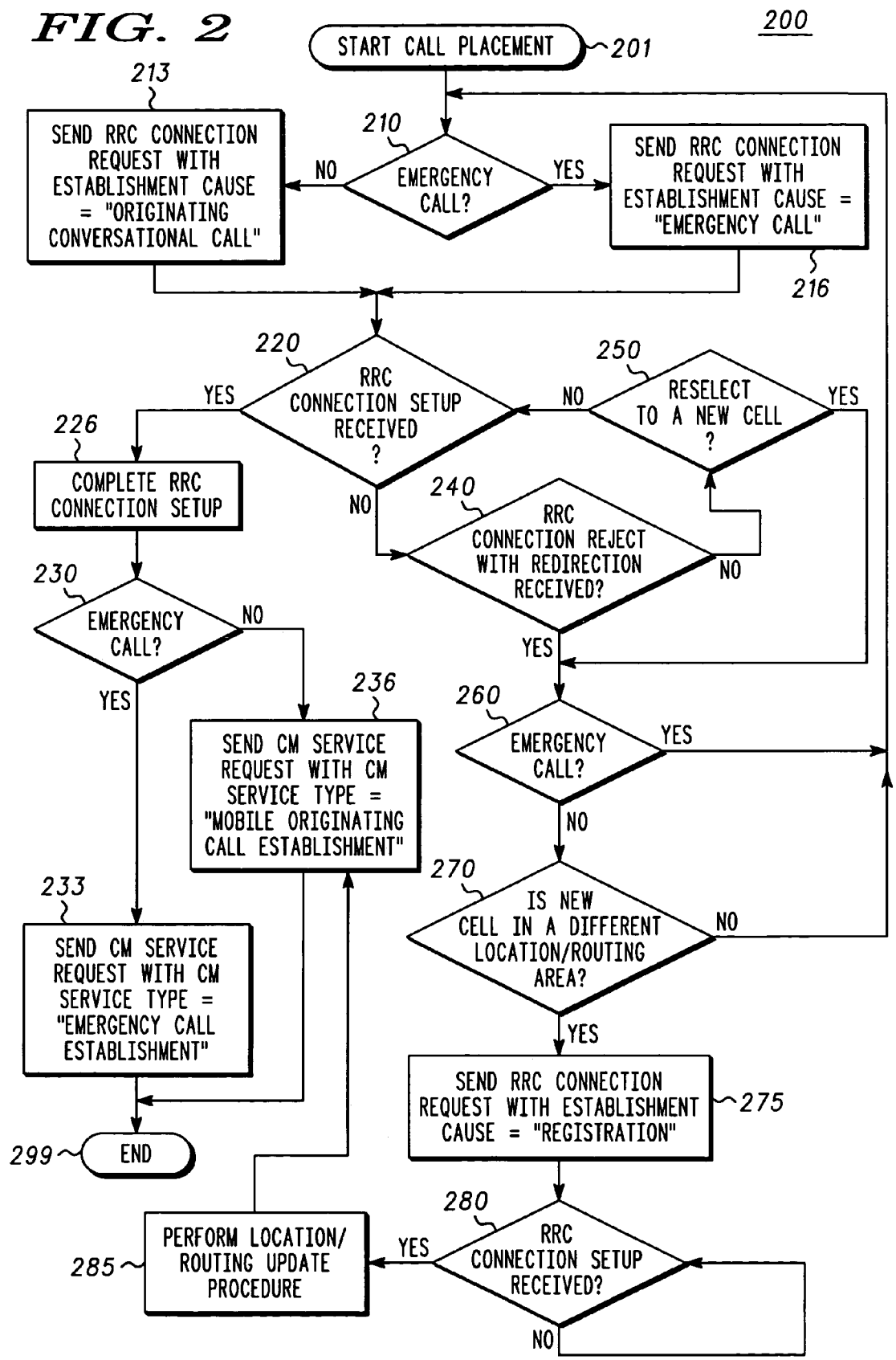
FIG. 2 shows a flowchart diagram of a call placement method according to the preferred embodiment.

FIG. 2 shows a flowchart diagram 200 of a call placement method according to the preferred embodiment. We shall use as an example the UE 115 in FIG. 1, which is camped on BS 125. First, we shall describe a normal, non-emergency flow. Step 201 starts call placement. If the call is not an emergency call, as determined in step 210, in step 213 the UE 115 sends to its serving BS 125 a radio resource control (RRC) connection request with "originating conversational call" as an establishment cause. If step 220 determines that the UE 115 received a network acknowledgement through the BS 125, such as an RRC Connection Setup message, the UE can complete the RRC connection setup in step 226, which includes sending an RRC Connection Setup Complete message to the network. Recalling that the call is not an emergency call, as determined in step 230, the UE 115 sends a connection management (CM) service request with "mobile originating call establishment" as the CM service type in step 236. At this point, the call placement process ends in step 299, and the circuit-switched connection is complete.

Still in a non-emergency call scenario, the network may not send an RRC Connection Setup message, as determined in step 220. Instead, the network may send an RRC Connection Reject as shown in step 240. The rejection message may contain instructions to redirect the UE to a different carrier frequency (e.g., from one WCDMA cell to another WCDMA cell) or another radio access technology (e.g., from WCDMA to GSM).

Also, if the network does not redirect the UE, the UE may autonomously reselect a new cell as determined in step 250. For example, while the UE 115 is monitoring a forward access channel (sometimes called FACH mode or pseudo FACH mode), the UE 115 may autonomously reselect BS 127 over BS 125 during the call placement process. Note that the UE may reselect to a WCDMA cell having the same carrier frequency as the original cell, a WCDMA cell having a different carrier frequency as the original cell, or a GSM cell.

Thus, described are at least two ways for the UE to change to a new cell. Another way to change to a new cell includes receiving a message from the network directing the UE to a particular cell.

Returning to FIG. 1, for example the network may redirect the UE 115 to a different WCDMA frequency, which results in a cell selection of BS 127. If the UE 115 changes from BS 125 to BS 127 either through redirection or reselection, the UE 115 is also changing its location area from LA 163 to LA 166 and its routing area from RA 174 to RA 176.

If there is no redirection or reselection, as determined in step 240 and step 250, the UE continues to wait for an RRC Connection Setup message in step 220.

If the UE in a non-emergency call, as recalled in step 260, is redirected or reselects to a cell in a different location area and/or routing area, as determined in step 270, the UE sends an RRC Connection Request with "registration" as an establishment cause, as shown in step 275. If there is a redirection or reselection in a non-emergency call placement, but no change in location area or routing area, the flow starts again at step 210. After an RRC Connection Setup message is received, as determined in step 280, the UE and the network perform a location area update or routing area update in step 285. An area update includes identification and authentication procedures, which may take up to several seconds to complete. If both a location area update and a routing area update are performed, more than one identification or authentication procedure may be required. After the area updates are completed, the UE sends a connection management (CM) service request with "mobile originating call establishment" as a CM service type, as shown in step 236. The non-emergency call placement flow then ends in step 299.

In an emergency call, it is advantageous to avoid the area update procedures (including the associated identification and authentication processes) of step 285 to reduce the time needed to set up the emergency call. After all, location areas and routing areas were established mainly for paging relating to call reception rather than call origination. An emergency call is assumed to be call origination from the UE. We return to the beginning of the flow chart at step 201.

If the call is an emergency call, as determined in step 210, the UE transmits a radio resource control (RRC) Connection Request with "Emergency Call" as an establishment cause in step 216. If an RRC Connection Setup message is received as determined in step 220, the UE completes the RRC connection setup in step 226 which includes sending an RRC Connection Setup Complete message to the network and, seeing that there is an emergency call in step 230, sends a CM Service Request with "Emergency Call Establishment" as a CM service type as shown in step 233. At this point, the call placement process ends in step 299, and the circuit-switched connection is complete.

If, however, the UE receives an RRC Connection Reject message with redirection, as determined in step 240, or if the UE reselects to a new cell as determined in step 250, step 260 recalls that it is trying to place an emergency call and returns to step 216, through emergency call determination step 210, and sends another RRC Connection Request with "Emergency Call" as an establishment cause instead of going to step 275 where "Registration" would be the establishment cause.

Thus, the method does not query whether the new cell is in a different location area or routing area in step 270 and subsequently does not perform a location area update or a routing area update in step 285. One of ordinary skill in the art can adapt this call placement method to other situations. For example, a packet-switched connection uses a similar messaging flow but does not need to send a CM Service Request message as shown in step 233 and step 236.

Figure 3:
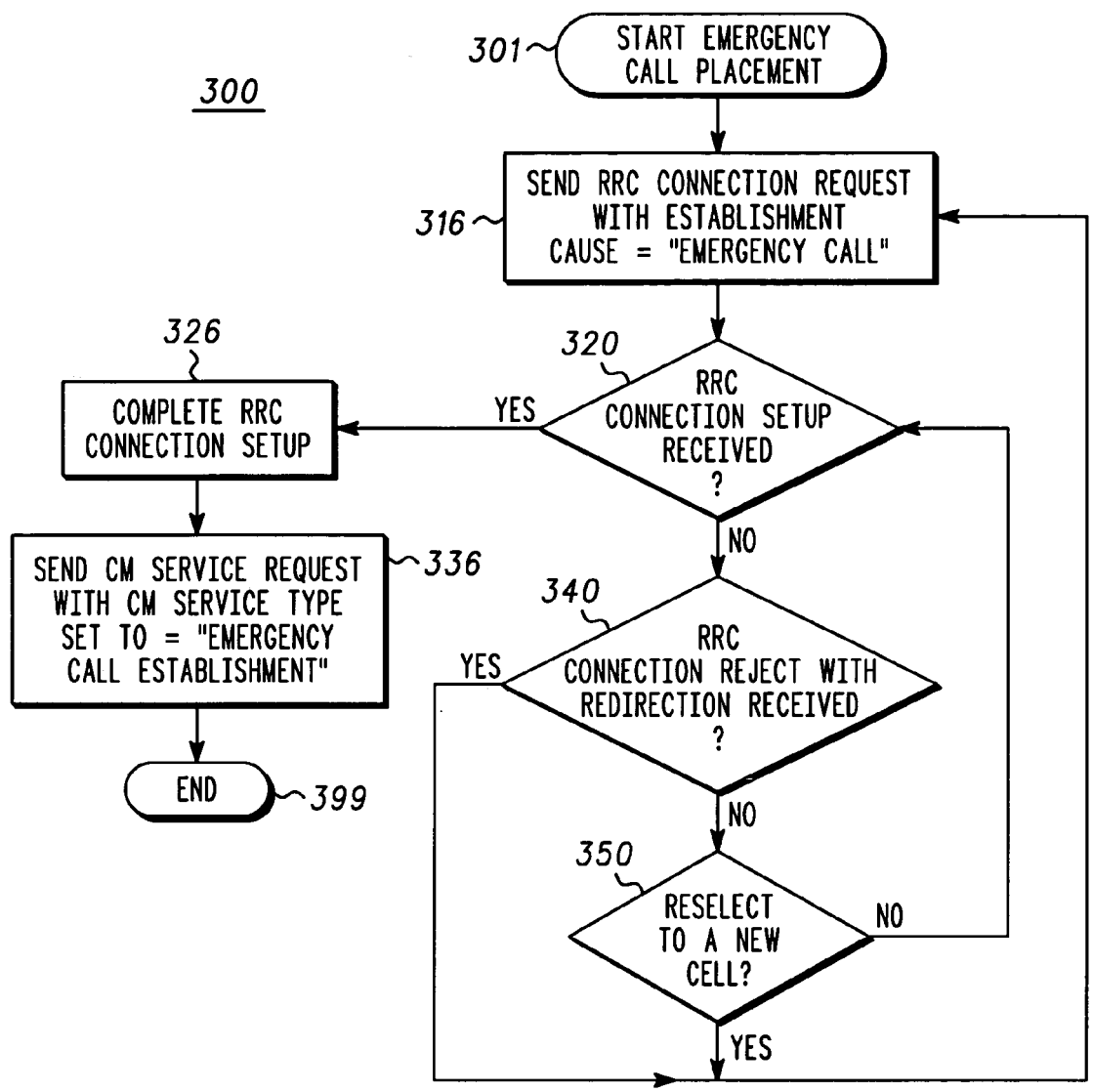
FIG. 3 shows a flowchart diagram of an emergency call placement method according to the preferred embodiment.

FIG. 3 shows a flowchart diagram 300 of an emergency call placement method according to the preferred embodiment. FIG. 3 is essentially only the emergency call placement portion of the flowchart diagram in FIG. 2 and clearly shows that no location area update or routing area update is performed during an emergency call placement.

Step 301 starts the emergency call placement. The UE sends an RRC connection request with an "emergency call" establishment cause in step 316. If an RRC Connection Setup message is not received by the UE as determined by step 320, the UE checks to see if an RRC Connection Reject with redirection is received in step 340 or if the UE has reselected a new cell in step 350. If either a redirection or reselection has occurred, the method returns to step 316 and sends another RRC connection request with an establishment cause of "emergency call." If neither a redirection nor reselection has occurred, the UE continues to wait for an RRC Connection Setup message in step 320.

Once an RRC Connection Setup message is received by the UE as determined by step 320, the UE completes the RRC Connection setup in step 326 which includes sending an RRC Connection Setup Complete message to the network and sends a CM Service Request with a CM service type of "emergency call establishment." Then the emergency call placement is complete in step 399.

Thus, the emergency call placement method avoids a location area update or a routing area update, which saves time when in an emergency situation. This preferred embodiment uses the terminology of 3G wireless communication networks; however, other wireless communication networks can implement the method described in this disclosure.

While this disclosure includes what are considered presently to be the preferred embodiment and best mode of the invention described in a manner that establishes possession thereof by the inventors and that enables those of ordinary skill in the art to make and use the invention, it will be understood and appreciated that there are many equivalents to the preferred embodiment disclosed herein and that modifications and variations may be made without departing from the scope and spirit of the invention, which are to be limited not by the preferred embodiment but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. An emergency call placement method for user equipment in idle mode camped on a first cell of a wireless communication network having a first radio access technology comprising the steps of:
   requesting a radio resource control connection using an establishment request;
   changing to a new cell in a different location area than the first cell without performing a location area update and without performing a routing area update, if the establishment request is "emergency call", and requesting again a radio resource control connection using "emergency call" as an establishment request;
   changing to a new cell in a different location area than the first cell and performing a location area update or a routing area update, if the establishment request is "originating conversation call", and requesting again a radio resource control connection using "registration" as an establishment request.

2. A method according to claim 1 further comprising the steps of:
   receiving a radio resource control connection setup message, after the step of requesting again a radio resource control connection using "emergency call" as an establishment request;
   completing a radio resource control connection setup, after the step of receiving; and
   sending a connection management service request using "emergency call establishment" as a service type.

3. A method according to claim 1 wherein the new cell is in a different location area than the first cell.

4. A method according to claim 3 wherein the new cell is in a different routing area than the first cell.

5. A method according to claim 1 wherein the new cell is in a different routing area than the first cell.

6. A method according to claim 1 wherein the step of changing to a new cell in a different location area than the first cell without performing a location area update and without performing a routing area update comprises redirecting to a new cell.

7. A method according to claim 1 wherein the step of changing to a new cell in a different location area than the first cell without performing a location area update and without performing a routing area update comprises reselecting to a new cell.

8. A method according to claim 1 wherein the new cell has a same carrier frequency as the first cell.

9. A method according to claim 1 wherein the new cell has a different carrier frequency than the first cell.

10. A method according to claim 1 wherein the new cell has a second radio access technology.

11. A method according to claim 10 wherein the first radio access technology is wideband code division multiplex access (WCDMA).

12. A method according to claim 10 wherein the second radio access technology is Global System for Mobile Communication (GSM).

13. A method for user equipment (UE) in idle mode camped on an old cell to place a call with a wireless communication network comprising the steps of:
    (a) requesting a radio resource control connection using an establishment cause;
    (b1) redirecting to a new cell in a different location area than the old cell and returning to step (a) without performing a location area update, if the establishment request is "emergency call" and if a radio resource control connection reject message has been received from the wireless communication network with redirection to a new frequency;
    (b2) redirecting to a new cell in a different location area than the old cell and performing a location area update, if the establishment request is "originating conversation call" and if a radio resource control connection reject message has been received from the wireless communication network with redirection to a new frequency;
    (c1) redirecting to a new cell in a different location area than the old cell and returning to step (a) without performing a location area update, if the establishment request is "emergency call" and if a radio resource control connection reject message has been received from the wireless communication network with redirection to a new radio access technology;
    (c2) redirecting to a new cell in a different location area than the old cell and performing a location area update, if the establishment request is "originating conversation call" and if a radio resource control connection reject message has been received from the wireless communication network with redirection to a new radio access technology;

(d1) reselecting to a new call in a different location area than the old cell and returning to step (a) without performing a location area update, if the establishment request is "emergency call" and if a neighboring cell provides better service;

(d2) reselecting to a new call in a different location area than the old cell and performing a location area update, if the establishment request is "originating conversation call" and if a neighboring cell provides better service;

(e) completing a radio resource control connection setup, if a radio resource control connection setup message has been received from the wireless communication network;

(f1) sending a connection management service request using "emergency call establishment" as a service type, if the establishment cause is "emergency call"; and (f1) sending a connection management service request using "mobile originating call establishment" as a service type, if the establishment cause is "originating conversation call".

14. A method for user equipment (UE) in idle mode camped on an old cell to place a call with a wireless communication network comprising the steps of:

(a) requesting a radio resource control connection using an establishment cause;

(b1) changing to a new cell in a different location area than the old cell and returning to step (a) without performing a location area update, if the establishment cause is "emergency call";

(b2) changing to a new cell in a different location area than the old cell and performing a location area update, if the establishment cause is "originating conversation call";

(c) completing a radio resource control connection setup, if a radio resource control connection setup message has been received from the wireless communication network;

(d1) sending a connection management service request using "emergency call establishment" as a service type, if the establishment cause is "emergency call"; and (d2) sending a connection management service request using "mobile originating call establishment" as a service type, if the establishment cause is "originating conversation call".

* * * * *